Patented Feb. 10, 1942

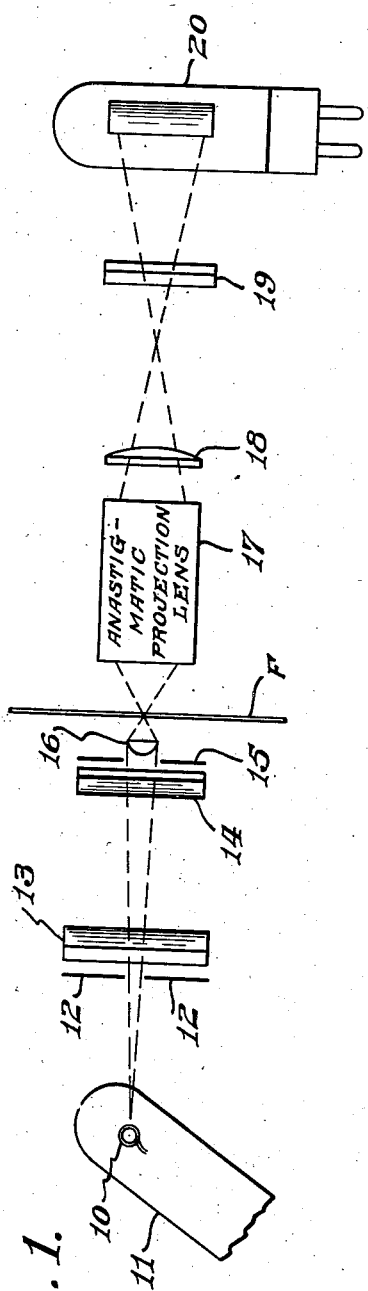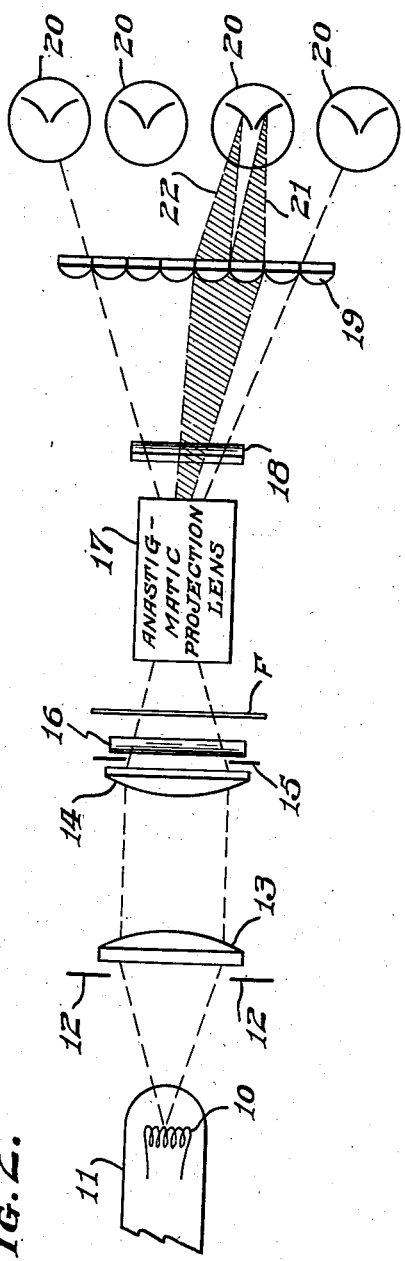

2,272,795

UNITED STATES PATENT OFFICE 2,272,795

PHOTOELECTRIC SOUND REPRODUCER

Glenn L. Dimmick, Haddonfield, N. J., assignor to Radio Corporation of America, a corporation of Delaware Application March 22, 1940, Serial No. 325,373

4 Claims. (Cl. 179—100.3)

This invention relates to a photoelectric sound reproducer of the sound on film type, and more particularly to such an apparatus adapted to operate with a multiplex sound track. For some purposes, it is highly desirable to provide a plurality of simultaneously reproduced sound tracks. This is particularly so when the reproduced sound is to be controlled as to volume, distribution or other characteristics by means of a control track as set forth in Weinberger Patent No. 1,850,701 and Beers Patent No. 2,098,561, which disclose the use of one or more sound tracks and a control track. In such apparatus there may be a distinct control tone for each audio frequency track, and the amplitude of a particular control tone in the control track determines the amplitude of the reproduction of the specific audio frequency track involved. Such systems broadly form no part of my invention which is directed more particularly to the soundhead and optical system for directing light modulated by the various sound and control tracks onto the photocells by which they are to be reproduced.

In the reproduction of a conventional sound track having a width of the order of 70 mils, it is comparatively simple to direct a small image of a slit upon the film, thereby producing a scanning line having a width of the order of three-quarters of a mil or less and to direct the light passing through the film onto a photocell. Such optical systems are well known and customarily use a microscope objective or the like to focus the light on the film.

When the multiplex sound tracks are used, it may be desirable to use push-pull tracks in which each half of a sound track carries a complete sound record or use what is known as "class B" push-pull tracks in which the opposite half waves are recorded in adjacent tracks as described, for example, in Dimmick Patent No. 2,093,423. Further, in the production of such multiple sound tracks, there is insufficient space available on the standard motion picture film and since a separate film is required, it becomes desirable to use the additional film area most effectively. Thus assuming four tracks on a film having a clear width of 1" between sprocket holes, the sound track widths may be doubled, giving a width for each sound track of the order of .140" to .160" and leaving adequate space between the sound tracks.

In the construction of the improved sound reproducer, use is made of an exciter lamp with the envelope inclined at an angle to avoid bulb reflections and the light is condensed by a group of lenses onto the necessary width of the film. The lens next preceding the film is a cylindrical lens of very short focal length which produces a sufficiently narrow line of light on the film, as described and claimed in Hardy Patent No. 2,010,-951. It is the length of the aperture immediately preceding this lens which determines the length of the line of light, while the focal length of the lens determines the width. The light from the illuminated area of the film is projected by an appropriate projection lens onto a series of cylindrical lenses corresponding in number with the number of half sound tracks to be reproduced, or, rather with the number of photocell cathodes on which the light is to be directed, and these cylindrical lenses direct each portion of the beam to its appropriate cathode.

One object of the invention is to provide an improved multiplex sound reproducer.

Another object of the invention is to provide an improved manner of mounting an exciter lamp so as to avoid stray reflections.

Another object of the invention is to provide an improved optical system for reproducing a multiple sound track.

Another object of the invention is to provide an improved form of light divider in sound reproducers.

Another object of the invention is to provide an improved means for collecting the light passing through a sound track and directing it onto the appropriate photocells.

Other and incidental objects of the invention will be apparent to those skilled in the art from a reading of the following specification and an inspection of the accompanying drawing in which—

Figure 1 is a side view of the optical system, that is, assuming that the film moves downwardly from the top to the bottom of the sheet, and Figure 2 is a top view corresponding to Fig. 1, in which the film would move perpendicularly to the plane of the paper.

Referring first to Fig. 1, the light source consists of the usual incandescent exciter lamp having a coil filament 10 and a tubular envelope 11. The faces of the tubular envelope reflect a considerable quantity of light, which may amount to as much as 8 or 10 percent, and, in order to prevent this reflected light from passing through the optical system and possibly affecting the definition of the image, I tilt the exciter lamp at an angle of possibly 30° to 45° from the perpendicular to the optical axis, as shown, so that any reflections from the back of the envelope are directed completely outside the path of light from the filament through the optical system. Light from the exciter lamp passes through a beam defining aperture in the plate 12 to a cylindrical condenser 13 which has its axis vertical. This condenser lens collects the light laterally into a beam of light which is substantially parallel in the lateral direction, as shown in Fig. 2. The lens 13 has no power in the vertical direction, as any vertical power would tend to enlarge the virtual image of the filament 10 and thereby tend to increase the size of the filament on the film. The light emerging from the lens 13 passes through the cylindrical condenser 14, which directs it through the aperture in the plate 15. This cylindrical condenser 14 is of such power as to direct substantially all the light passing through the aperture 15 into the anastigmatic projection lens 17. Between the aperture plate 15 and the film there is located a cylindrical lens 16 of very short focal length. The focal length of this lens is sufficiently short so that the image of the filament 10 which is formed by it on the film F has a width of the order of 1 mil or less, as described in the Hardy patent referred to above, and this fine line of light serves to scan the sound track on the film passing therethrough.

After emerging from the film, the light passes through the projection lens 17 and the cylindrical lens 18 onto the series of cylindrical lenses 19. The projection lens 17 is of such focal length that if the cylindrical lens 18 is omitted, a series of images of the sound tracks on the film F are formed on the splitting cylinders 19, and these cylinders then cause the light to converge on the several photocell cathodes as indicated at 21 and 22 in Fig. 2. The cylindrical lens 18 has no effect in the horizontal plane and, accordingly, does not interfere in any way with the projection of the images of the sound tracks on the lenses 19 nor with their directing the light on the cathodes of the photocells 20. The cylindrical lens 18, since it has its axis horizontal, causes the light to converge, as shown in Fig. 1, to a horizontal line before it reaches the cylinders 19 and the light diverges from the said line through the cylinders 19 to the cathode of the photocells 20, thereby covering a large portion of the cathode length of the photocells as shown in Fig. 1.

It will be apparent that although I have shown four push-pull photocells which would operate with eight push-pull sound tracks, the invention is not limited to such an arrangement, but eight single sound tracks might be used with the same arrangement and a larger or smaller number of photocells may be used as desired. Also, as many or as few of these tracks as desired may be used as control tracks, or all may be used as sound tracks according to the purpose of the particular apparatus.

It will be also apparent that a tilted exciter lamp is not limited to use in a sound reproducer, but it may be used in sound recording apparatus or in any other analogous optical apparatus where it is necessary to avoid reflections from the envelope of a light source.

Having now described my invention, I claim:

1. In an optical system for sound reproduction from a plurality of sound tracks on a film movable with respect to a translation point, means for illuminating the film at said translation point, means for directing an image of the sound tracks on the film onto a plurality of cylindrical lenses, and means for dispersing said images longitudinally of said cylindrical lenses.

2. In an optical system for sound reproduction from a plurality of sound tracks on a film movable relatively to a translation point, means for illuminating the film at said translation point, means for directing an image of the sound tracks on the film onto a plurality of cylindrical lenses, means for dispersing said images longitudinally of said cylindrical lenses, and photocells having their cathodes located to receive the beams passing through said cylindrical lenses.

3. In an optical system for sound reproduction from a plurality of sound tracks on a film movable relatively to a translation point, means including a cylindrical lens of short focal length adjacent the film for illuminating the film at said translation point, means for directing an image of the sound tracks on the film onto a plurality of cylindrical lenses, means for dispersing said images longitudinally of said cylindrical lenses, and means for directing light through said cylindrical lens into the said image forming means.

4. In an optical system for sound reproduction from a plurality of sound tracks on a film movable relatively to a translation point, means for illuminating the film at the translation point, a projection lens forming images of the sound tracks on the film on a plurality of cylindrical lenses, means for dispersing said images longitudinally of said cylindrical lenses, said means for directing the light on the film including a cylindrical lens of short focal length adjacent the film, and means for directing light through said cylindrical lens into the said image forming means.

GLENN L. DIMMICK.